United States Patent [19]

Webber

[11] Patent Number: 4,569,466

[45] Date of Patent: Feb. 11, 1986

[54] FISHING ROD HOLSTER

[76] Inventor: Louis A. Webber, 4558 Rueda St., San Diego, Calif. 92124

[21] Appl. No.: 617,044

[22] Filed: Jun. 4, 1984

[51] Int. Cl.[4] .............................................. A01K 97/10
[52] U.S. Cl. ................................... 224/253; 224/922; 224/268
[58] Field of Search ............... 224/922, 253, 904, 269, 224/268, 226, 242, 252, 270, 224, 251, 907, 197; 43/25; D22/14; D3/38

[56] References Cited

U.S. PATENT DOCUMENTS

| | | | |
|---|---|---|---|
| 710,236 | 9/1902 | Audley | 224/251 |
| 954,765 | 4/1910 | Rune | 224/907 X |
| 1,425,067 | 8/1922 | Stone | 224/922 X |
| 2,137,645 | 11/1938 | Doench | 224/922 X |
| 2,830,478 | 4/1958 | Prince | 224/197 X |
| 2,846,129 | 8/1958 | O'Brien | 224/907 X |
| 3,307,754 | 3/1967 | Anketell | 224/253 X |
| 3,637,120 | 1/1972 | Clay | 224/251 X |
| 3,874,573 | 4/1975 | Fruscella et al. | 224/242 |
| 4,106,679 | 8/1978 | Hillinger | 224/197 |
| 4,372,468 | 2/1983 | Harvey | 224/268 |

*Primary Examiner*—Stephen Marcus
*Assistant Examiner*—Robert Petrik
*Attorney, Agent, or Firm*—John E. Benoit

[57] ABSTRACT

A fishing rod holster having a flat base with belt attaching slots in its upper portion, a first rigid support loop hinged to one side of the lower portion of the base and an upwardly open substantially U-shaped rigid support hinged to the other side of the lower portion, the U-shaped rigid support being substantially nearer the belt line through said slots than is the first rigid support whereby the handle of the rod is supported by both supports, the distance between said supports being of a dimension sufficient to permit a fishing reel mounted on the butt to rest therebetween while the rod extends outwardly and upwardly from the person using the rod.

12 Claims, 4 Drawing Figures

FISHING ROD HOLSTER

This application relates generally to holsters for fishing rods and more particularly to a holster which is worn by the fisherman and which is movable from a usable support system to into a substantially flat piece of equipment.

Numerous rod holders and holsters have been proposed for purposes of freeing the hands of the fisherman. Some supports also have been proposed to free the hands of the fisherman even while fishing. However, the various proposed supports have certain limitations relative to their usefulness both for baiting the hook, removing the fish and for still fishing. Further, many such supports have very complicated mechanisms or include costly materials and construction. Additionally, all of such holders known to me present which are worn by the fisherman include elements which project outwardly and, therefore, are likely to catch the clothes of the wearer or abraid or scratch his arms and hands.

U.S. Pat. No. 1,198,202 issued Sept. 12, 1916 discloses a fishing device to be worn by a fisherman so as to allow him to have his hands free. This is a multicomponent rather complicated device which includes a harness worn by the fisherman together with a belt and an attached socket for holding the rod. Additionally, the rod must be supported by a chain attached to the harness. Because of all of the equipment involved, the apparatus is awkward and presents many protruding elements which are likely to hook the clothing, hands or arms of the fisherman.

U.S. Pat. No. 1,174,319 discloses a fish rod holder which comprises a belt and a metal body portion with a protruding rod holder which is also made of metal and which is adjustable in a vertical position relative to a ratchet which is a part of the mechanism. Again, this is complicated, and expensive relative to the materials to be used in making the device. Further, the rod holder always remains in the protruding position and presents a problem relative to snagging of clothing, hands and/or arms.

U.S. Pat. No. 1,786,254 issued Dec. 23, 1930 discloses a fish rod holder attachable to the body of a person which includes a metal frame with an upstanding portion for accepting the butt end of the rod and two biased rollers through which the rod may be pressed downwardly. The rollers are biased by means of metal springs attached to the base plate. Again, this is a complicated arrangement and expensive relative to the materials used and the construction of the device, and also is in a protruding position.

U.S. Pat. No. 3,874,573 issued Apr. 1, 1975 discloses a fishing rod holster which is in the form of a base plate having integral loops substantially vertical relative to each other. The butt end of the rod may be inserted through the loops so as to have the rod extend upwardly nearly vertically. The purpose of this device is to allow the fisherman to bait the hook or remove the fish from the hook with both hands free. There is no provision in this particular holster for allowing the fisherman to do any type of "still" fishing since the rod is substantially vertical.

Accordingly, it is an object of this invention to provide a rod holster attached to the belt of the fisherman for holding a fishing rod in a position for either baiting the hook, changing the lure, removing the fish, or still fishing.

A further object of this invention is to provide a rod holster which is attached to the belt of the wearer which places the fishing rod at an angle such that "still" fishing may be performed while having both hands free.

Another object of this invention is to provide a rod holster attached to the belt wearer wherein the components which hold the rod may be folded so as to be placed in a substantially flat, covered position when not in use.

These and other objects of the invention will become apparent from the following description taken together with the drawings.

SUMMARY OF THE INVENTION

The present invention provides a fish rod holster for bait caster/spinning/fly rods having a flat base with belt attaching slots in its upper portion, a substantially closed rigid loop hinged to one side of the lower portion of the base and an upwardly open substantially U-shaped rigid support hinged to the other side of the lower portion of the base with the U-shaped support being substantially nearer the belt line through the slots than is the closed rigid support loop whereby the closed support holds the butt of the rod and the U-shaped support holds the handle of the rod with the distance between the supports being of a dimension sufficient to permit a fishing reel mounted on the butt to rest therebetween while the rod extends outwardly and upwardly from the person using the rod. The holster is modified for standard fly rods by replacing the closed loop with an upwardly open loop similar to the above-described loop. While in use, the butt and reel extend rearwardly of the supports.

DETAILED DESCRIPTION OF THE DISCLOSURE

Figures 1, 2:
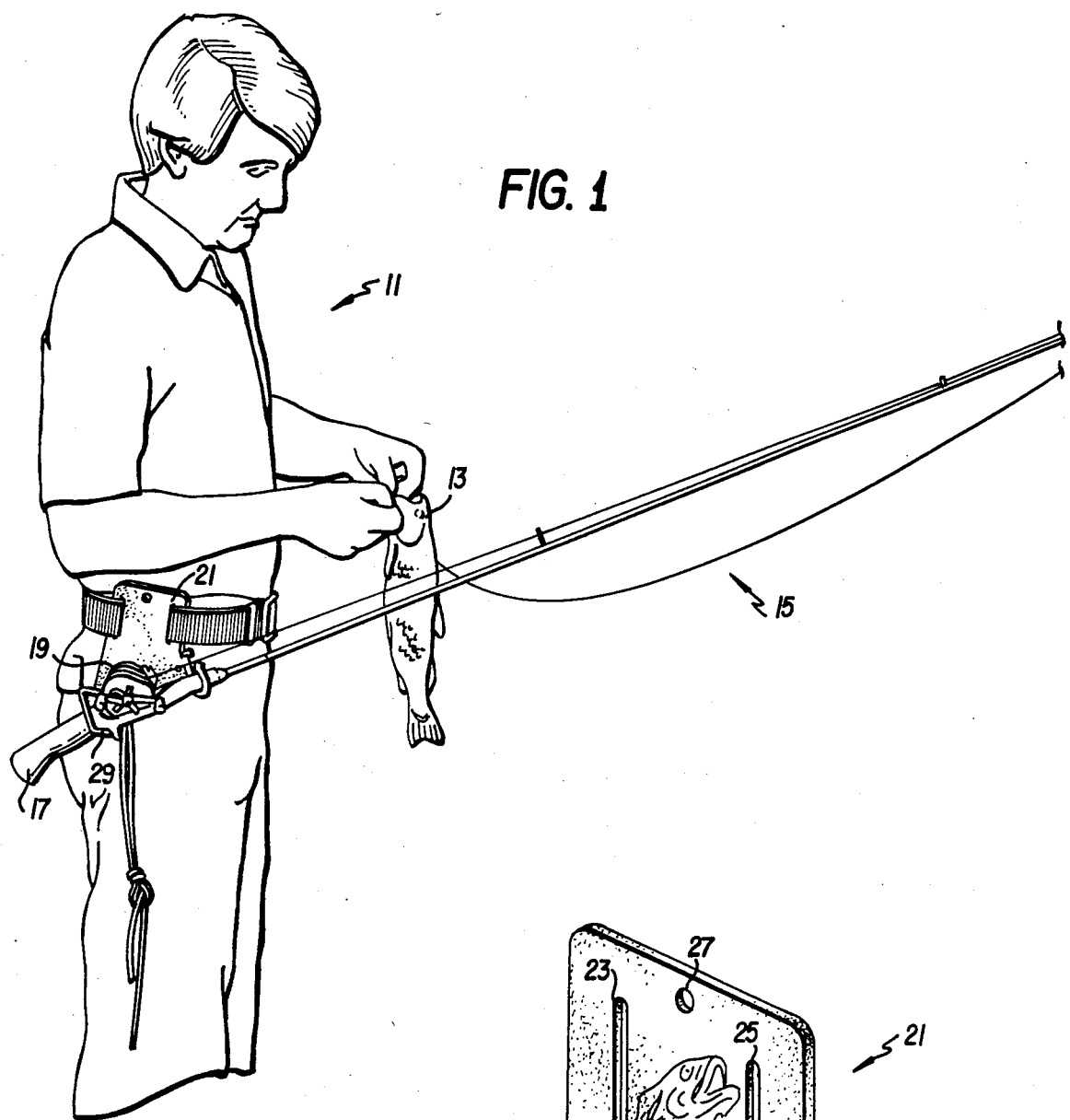
FIG. 1 is a schematic of a fisherman having a fishing rod in place in the rod holster of the present invention.
FIG. 2 is a perspective view of one embodiment of the rod holster of the present invention.

FIG. 1 illustrates fisherman 11 removing a fish 13 from the line of fishing rod 15. The rod itself is shown in place in one embodiment of the rod holster of the present invention with reel 19 mounted on butt 17 of the rod. While the disclosure of FIG. 1 illustrates a basic use of the holster of the present invention, the details will be more clearly seen from the showings in FIGS. 2 and 3.

Rod holster 21 consists of base 22 which, in a preferred instance, is of a flexible substance such as leather. The upper portion of the base includes slots 23 and 25 through which belt 45 of the wearer is passed thereby retaining the rod holster in position at the side of the fisherman as shown in FIG. 1. There is also illustrated hole 27 at the upper part of base 22. Although this hole is not used during fishing, it provides a handy means for storing the rod holster on a hook or the like.

Substantially closed rigid support loop 29 is hinged at 31 to the lower portion of base 22. Hinge 31 is formed by an integral flap which encloses the inner part of loop 29 and is secured to base 22 by means such as rivets 41 as is more clearly shown in the rear view of FIG. 3.

A substantially U-shaped rigid support 35 is hinged at 39 to the opposite lower side of base 22. Support 35 terminates at its upper end in finger 37 which maintains the support within hinge 39. Again, this hinge is formed by means of an integral flap 47 secured to the base at its ends by means such as rivets 33. These hinges permit rotation of the supports substantially 360° so as to place them behind base 22 when not in use as shown in FIG. 3.

A slot 43 or like opening is provided in the lower portion of base 22 in order to accept thong 44. This thong may be used to hold any type of accessory such as a line clipper, or it may be used as a hold down strap if desired.

Figure 3:
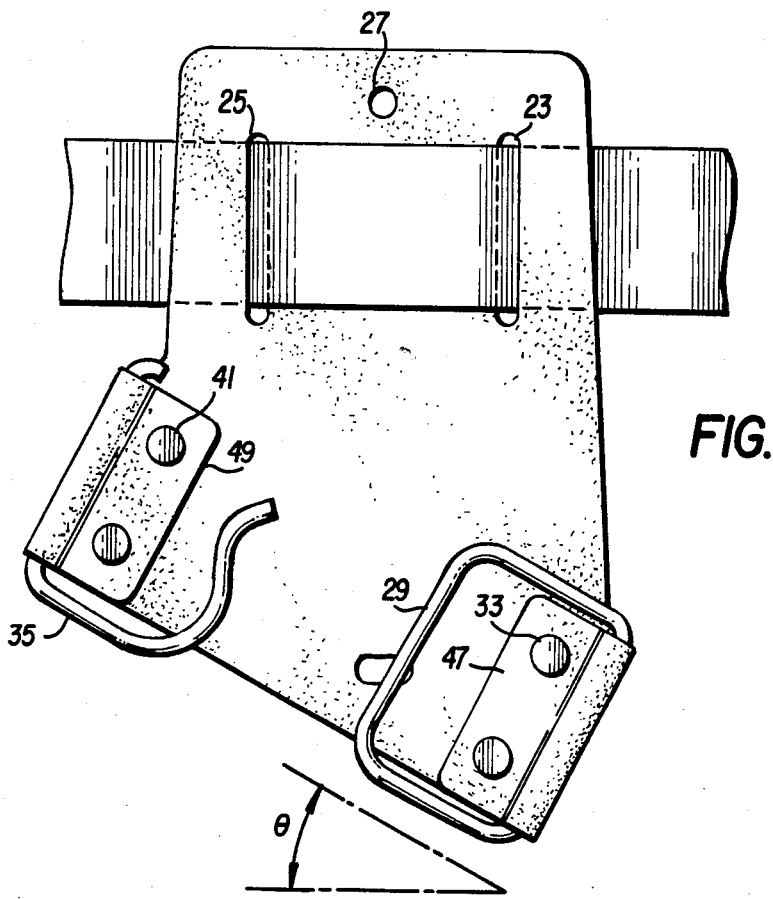
FIG. 3 a rear elevational view of the rod holster of FIG. 2 in place on the belt of the wearer in a position of non-use.

The holster as shown in FIGS. 2 and 3 is designed for bait casters and spinning rods. The larger closed loop 29 accepts the handle butt. After the butt is in place as shown, the rod may be lowered so that the forward part of the handle rests on support 35 so as to be in a position as shown in FIG. 1. It should be noted that the distance between supports 29 and 35 is of a sufficient dimension to permit a fishing reel mounted on the handle of the rod to rest between the two supports. This is true regardless of the type of rod which is used.

When worn, U-shaped support 35 is substantially nearer the belt line of the wearer than is the substantially closed support 29 so that the rod extends outwardly and upwardly at angle $\phi$ relative to the line of the belt passing through the slots. Angle $\phi$ is an optimal angle for still fishing, preferably between 20° and 50° with the preferred angle being substantially 30°.

A bait casting rod as shown in FIG. 1 normally includes a finger extending from the butt below and to the rear of the reel which constitutes part of the grip. With this type of rod, the finger acts as a stop by abutting support 29.

Figure 4:
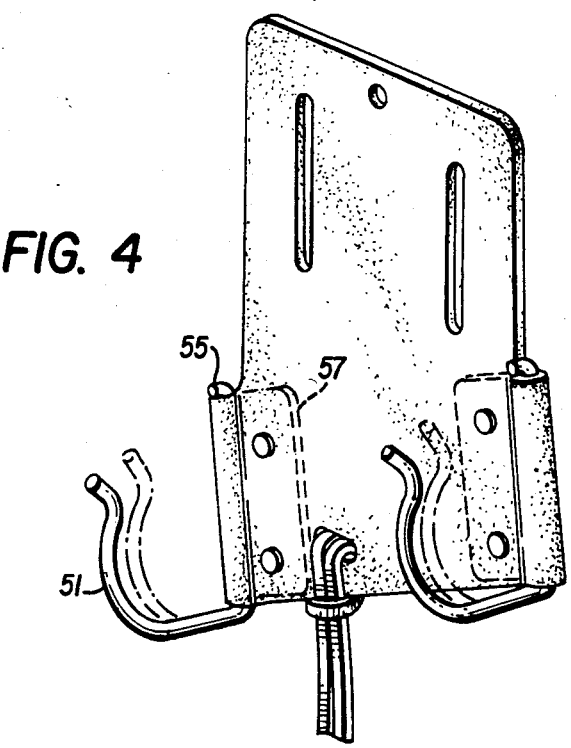
FIG. 4 is a perspective view of a modified embodiment of the rod holer of the present invention.

The basic rod holster of FIGS. 2 and 3 may be modified so as to support standard fly rods. This modification is illustrated in FIG. 4. The closed loop 29 of FIG. 2 is replaced by U-shaped support 51 which is substantially the same as support 35 of FIG. 2 so that both supports are substantially the same. Additionally, the supports may be made of "dead soft" aluminum to allow for adjustment so as to fit a particular butt.

When the holster of FIG. 4 is used, the procedure is as follows. The rear portion of the fly rod is placed into the supports with the handle butt and reel extending rearwardly of support 51. The rod is then moved forward until the handle of the fly rod is resting in the supports and the butt and reel extend rearwardly of the supports. Since these hooks are made of a bendable material, such as aluminum, they may be initially adjusted as shown by the dotted lines in FIG. 4 so as to properly fit the fly rod used by the individual fisherman. The hooks may also be rotated outwardly so as to bear against the rod and handle, thereby increasing holding power. The use of the holster in this manner provides proper balance of the rod while it is resting in the supports.

One of the advantages of the present invention is that, when the rod holster is not in use, the support members may be rotated about the hinge so as to be on the inner side of base 22 as shown in FIG. 3. This substantially eliminates the possibility of any part of the rod holster catching clothing, arms, hands or any other equipment and, effectively, removes the obstruction of the holster without actually removing it from the belt. Since the support members are rotatable substantially 360°, with the exception of the thickness of the leather, the support members may, if desired, be folded to the front face of the base. Although this generally removes them from being an obstruction, it still does not provide the total protection so as to prevent hooking or snagging of clothing or the like as does the rearward rotation.

As can be seen, the present invention provides a relatively inexpensive, yet very effective, means for allowing the fisherman to bait the hook, change the lure or remove the fish using both hands while still maintaining the rod secure and ready at his side. Further, the fisherman can even "still" fish with no hands while he is doing other relaxing things such as reading a book or eating. Additionally, the rod holster lies flat against the hip, out of the way when it is not being used.

The holster is preferably made of embossed leather such as top grain cowhide and strong rust-free metals so as to be substantially free of deterioration over a long period of time. Additionally, the thong may be provided for whatever use may be desired.

The above description and drawings are illustrative only since there may be variations in dimensions of the various elements of the rod holster without departing from the invention, the scope of which is to be limited only by the following claims.

I claim:

1. A fishing rod holster worn by a user for positioning and holding a fishing rod comprising
   a substantially flat base;
   belt attaching means at the upper portion of said base;
   a first hinge formed at the side edge of said base,
   a first substantially rigid support loop secured to said first hinge;
   a second hinge formed at the side of said base opposite said first hinge;
   an upwardly open substantially U-shaped rigid support member secured to said second hinge, said U-shaped support member being substantially nearer the belt line through said slots than said first support loop, the distance between said supports being of a dimension sufficient to permit a fishing reel on the handle of a rod to rest therebetween.

2. The rod holster of claim 1 wherein said support members are rotatably contained within a flap integral with said base so as to provide said hinge.

3. The rod holster of claim 1 wherein said support members are rotatable about said hinges substantially 360°.

4. The rod holster of claim 1 wherein said support members are rotatable to a position abutting said base.

5. The rod holster of claim 1 further comprising a thong secured to said lower portion of said base.

6. The rod holster of claim 1 wherein said belt attaching means comprises a plurality of slots in the upper portion of said base.

7. The rod holster of claim 1 wherein said supports hold said rod at an angle between 20° and 50° relative to the line of the belt passing through said belt attaching means.

8. The rod holster of claim 1 wherein said supports hold said rod at an angle of substantially 30° relative to the line of the belt passing through said belt attaching means.

9. The rod holster of claim 1 wherein said first support forms a substantially closed loop.

10. The rod holster of claim 1 wherein said first support member forms an open substantially U-shape.

11. The rod holster of claim 3 wherein said support loop extends from the ends of said hinge formed by said loop.

12. The rod holster of claim 10 wherein said supports are of a bendable material.

* * * * *